F. H. SANBORN.
TRAP NEST.
APPLICATION FILED FEB. 3, 1910.
1,000,950.
Patented Aug. 15, 1911.
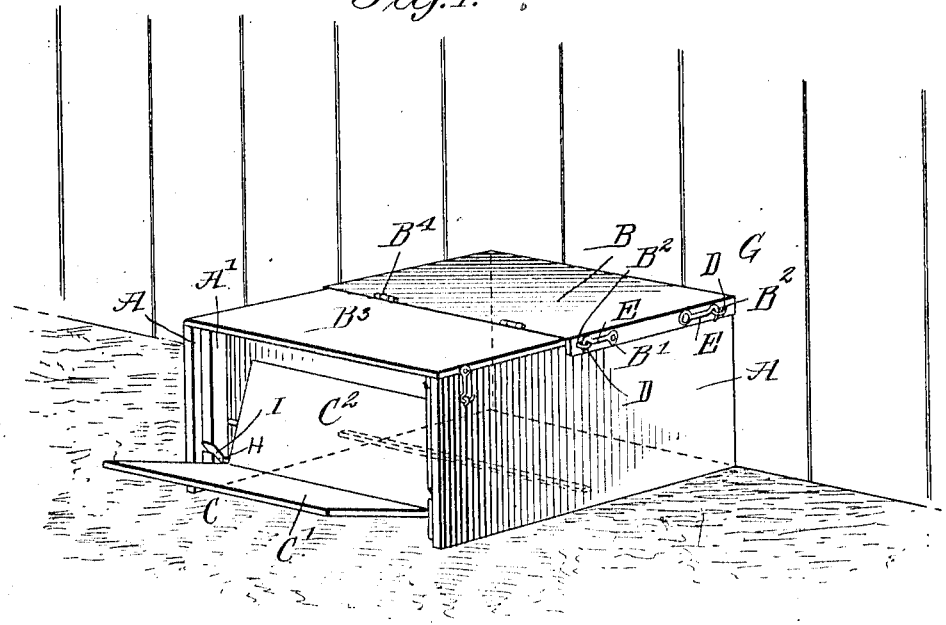
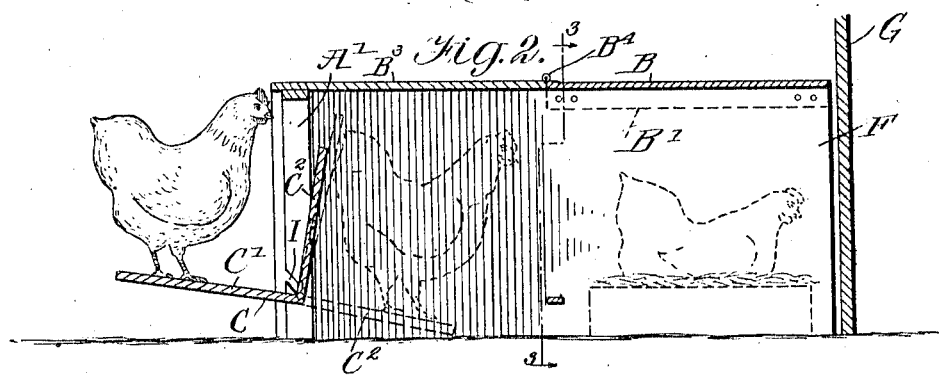
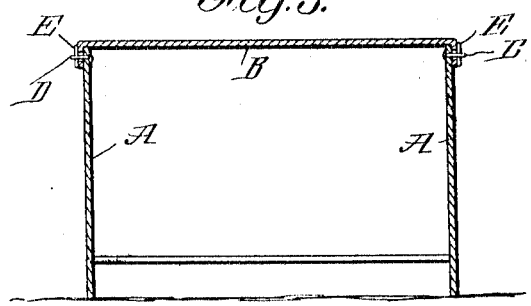
WITNESSES:
Samuel E. Wade.
Perry B. Turpin.
INVENTOR
FREEMAN H. SANBORN
BY Munn & Co.
ATTORNEYS

UNITED STATES PATENT OFFICE.

FREEMAN HUTCHINS SANBORN, OF DENMARK, MAINE.

TRAP-NEST.

1,000,950.      Specification of Letters Patent.      Patented Aug. 15, 1911.

Application filed February 3, 1910. Serial No. 541,662.

*To all whom it may concern:*

Be it known that I, FREEMAN HUTCHINS SANBORN, a citizen of the United States, and a resident of Denmark, in the county of Oxford and State of Maine, have invented certain new and useful Improvements in Trap-Nests, of which the following is a specification.

This invention is an improvement in trap nests, seeking to provide means whereby it may be determined which hen has laid any particular egg and also to avoid any annoyance of the hen while on the nest, and the invention consists in certain novel constructions and combinations of parts as will be hereinafter described and claimed.

In the drawing Figure 1 is a perspective view of the nest with the door in the position it occupies when the nest is empty. Fig. 2 is a vertical longitudinal section showing the door in the same position in full lines and in its other position in dotted lines and Fig. 3 is a cross section on about the line 3—3 of Fig. 2.

By my invention I seek to provide a simple, economical construction which can be readily cleaned, to which end its several parts are detachable or separable, and which will effectually trap the hen without preventing the fowl from leaving the nest when desired.

As shown the trap includes the sides A, the top B and the door C. The top B is provided at its sides with depending flanges B' provided with slots B² for the passage of staples D and hooks E pivoted to the flanges B' engage with the staples D to lock the sides and top together when the parts are assembled for use as shown in Figs. 1, 2 and 3 of the drawing. It will be noticed that the box formed by the sides and top is open at the bottom and at both ends, its inner end F being conveniently closed by arranging the nest up against a board or other inclosure as shown at G in Figs. 1 and 2 and the outer end of the box being controlled by the door C as more fully described hereinafter. This door C is detachably supported in position so it can be conveniently removed and applied and when the door is removed the sides and top can be conveniently detached to facilitate their cleansing and storage or shipment as may be desired in the practical use of the invention.

The door C is formed with the wings C' and C² arranged at an angle of about 110° to each other, rigidly united at one edge and pivoted at such edge in the open outer end of the nest near the bottom thereof so the door may be rocked between the positions shown in full and dotted lines in Fig. 2 to permit the entrance of the hen, her exit and to afford protection to the hen while on the nest.

In pivoting the door, it is preferably provided at its ends in line with the juncture of its wings C' and C² with pivot studs H which fit removably in slots I in the outer edges of the cleats A'. By this construction, the door can be conveniently applied and removed and will operate efficiently without the necessity of any latch devices for retaining it in either of its positions as shown.

The sectional construction of the nest box as before described coöperates with the construction for removably supporting the door in avoiding any corners or angles which cannot be cleansed perfectly when the parts of the box are detached and the removability of the door permits the convenient use of the nest either as a trap nest or as an ordinary nest as may be desired in the use of the invention.

In practice the nest may be made of wood, sheet metal or other suitable material without departing from the principles of the invention.

It will be noticed that when the nest is unoccupied as shown in Fig. 1, the wing C² of the door forms a closure for the entrance and that when the nest is occupied the wing C' forms the closure and inclines in such position of the parts at its upper end into the nest, an open space being provided above the upper edges of the wings in both instances.

The outer portion B³ of the top B may be hinged at B⁴ as shown.

I claim:

The trap nest herein described, open at its outer end and provided at its said outer end with an oscillating door pivotally mounted at its lower end and movable freely in both directions, the said door being composed of two wings at an angle to each other greater than a right angle with the pivot of the door slightly elevated whereby when the outer wing is lowered the inner wing will stand approximately vertical, one of the said wings guarding the entrance to the nest in one position of the door and the other wing guarding the entrance to the nest in the other position of the door and the door being free to oscillate in both directions so a hen may enter and leave the nest through the same door way, passing in both directions over both wings of the door, substantially as set forth.

FREEMAN HUTCHINS SANBORN.

Witnesses:
ADA M. GRAY,
FLORA P. ORDWAY.